United States Patent [19]

Takada

[11] Patent Number: 4,485,478

[45] Date of Patent: Nov. 27, 1984

[54] DIGITAL BURST SIGNAL TRANSMISSION SYSTEM

[75] Inventor: Masami Takada, Tokyo, Japan

[73] Assignee: Nippon Electric Co., Ltd., Tokyo, Japan

[21] Appl. No.: 382,983

[22] Filed: May 28, 1982

[30] Foreign Application Priority Data

Jun. 3, 1981 [JP] Japan .................................. 56-85410

[51] Int. Cl.³ .............................................. H03C 1/06
[52] U.S. Cl. .................................... 375/60; 332/37 R; 375/68
[58] Field of Search ....................... 455/102, 108, 114; 375/58, 68, 60, 70, 72, 73; 331/172, 173; 332/9 R, 37 R, 41; 343/17.1; 370/6, 9

[56] References Cited

U.S. PATENT DOCUMENTS

| 2,089,781 | 8/1937 | Buschbeck | 375/72 |
| 3,225,314 | 12/1965 | Rambo | 455/91 |
| 3,418,581 | 12/1968 | Kennedy et al. | 375/68 |
| 3,649,918 | 3/1972 | Freedman et al. | 331/173 |
| 3,688,214 | 8/1972 | Goldie | 331/173 |

Primary Examiner—Benedict V. Safourek
Attorney, Agent, or Firm—Sughrue, Mion, Zinn, Macpeak and Seas

[57] ABSTRACT

A gated data burst in a multiplex transmission system is low pass filtered and modulates a carrier wave. The modulated signal has transient skirts on its leading and trailing edges due to the roll-off characteristic of the filter, and these skirts would ordinarily interfere with the signal bursts in adjoining time slots. To avoid this the skirts are clipped off by a further gate signal whose window is slightly wider than that of the first gate, and which is timed such that its edges occur at 0 levels of the burst carrier.

13 Claims, 53 Drawing Figures

FIG. I
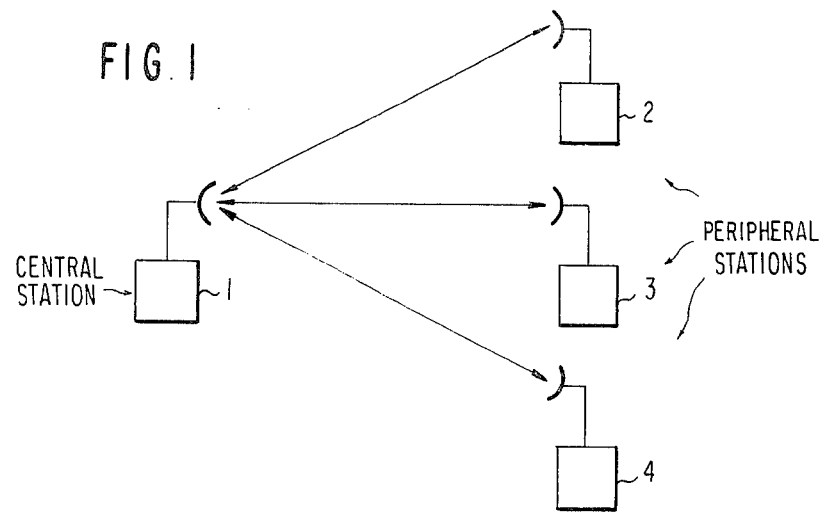
FIG. 2A
FIG. 2B
FIG. 2C
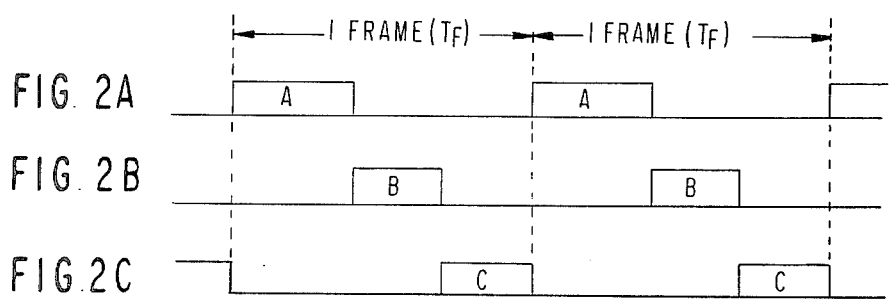
FIG. 3
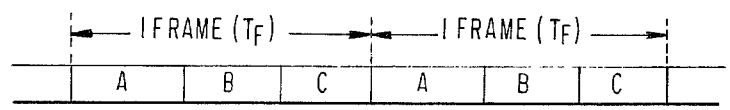

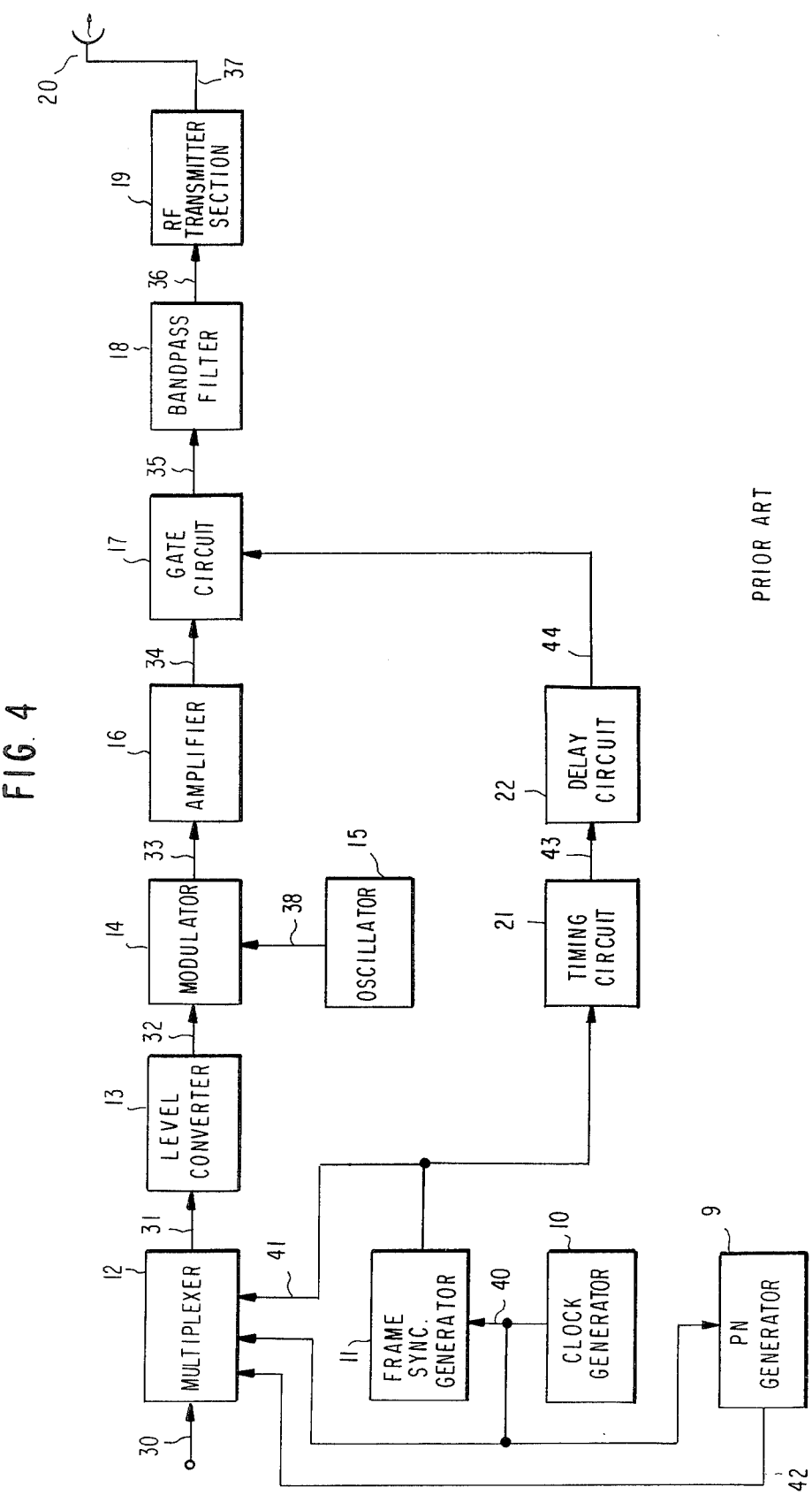

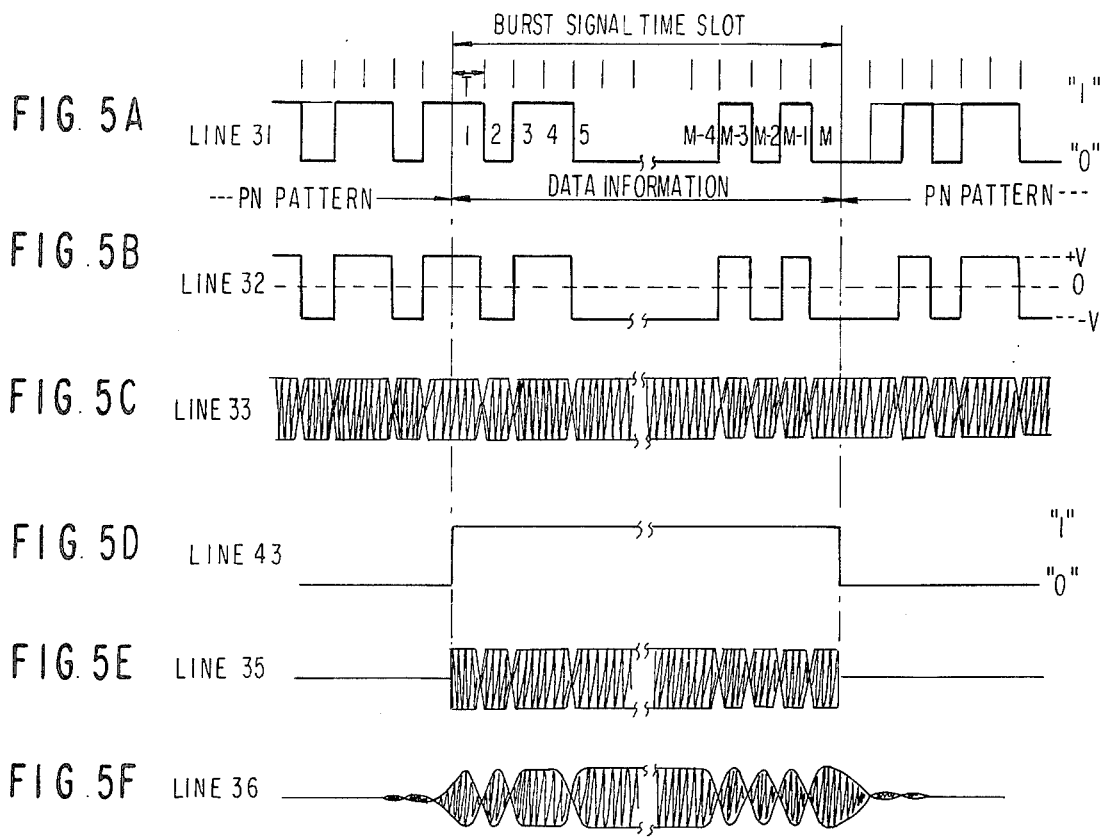
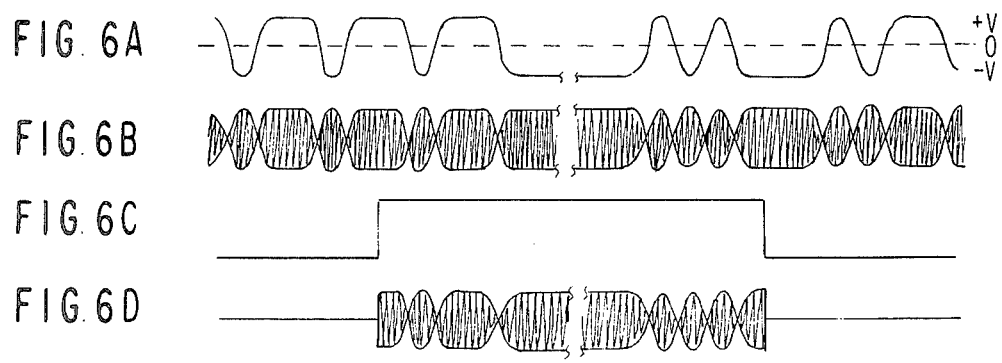

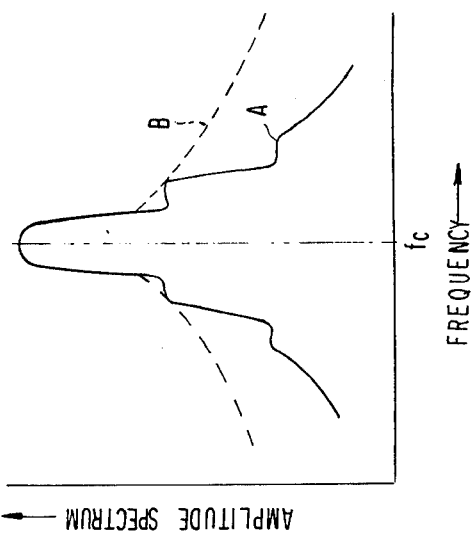
FIG. 9
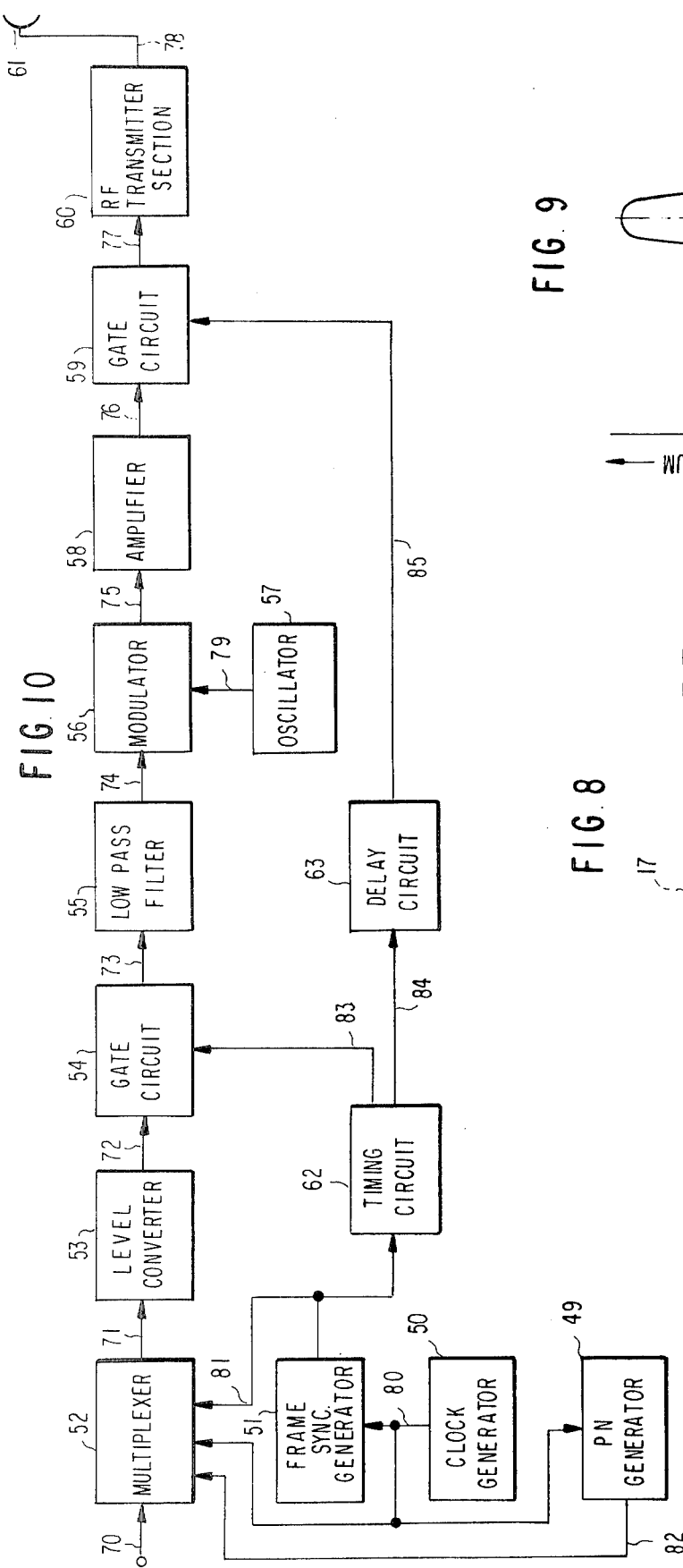

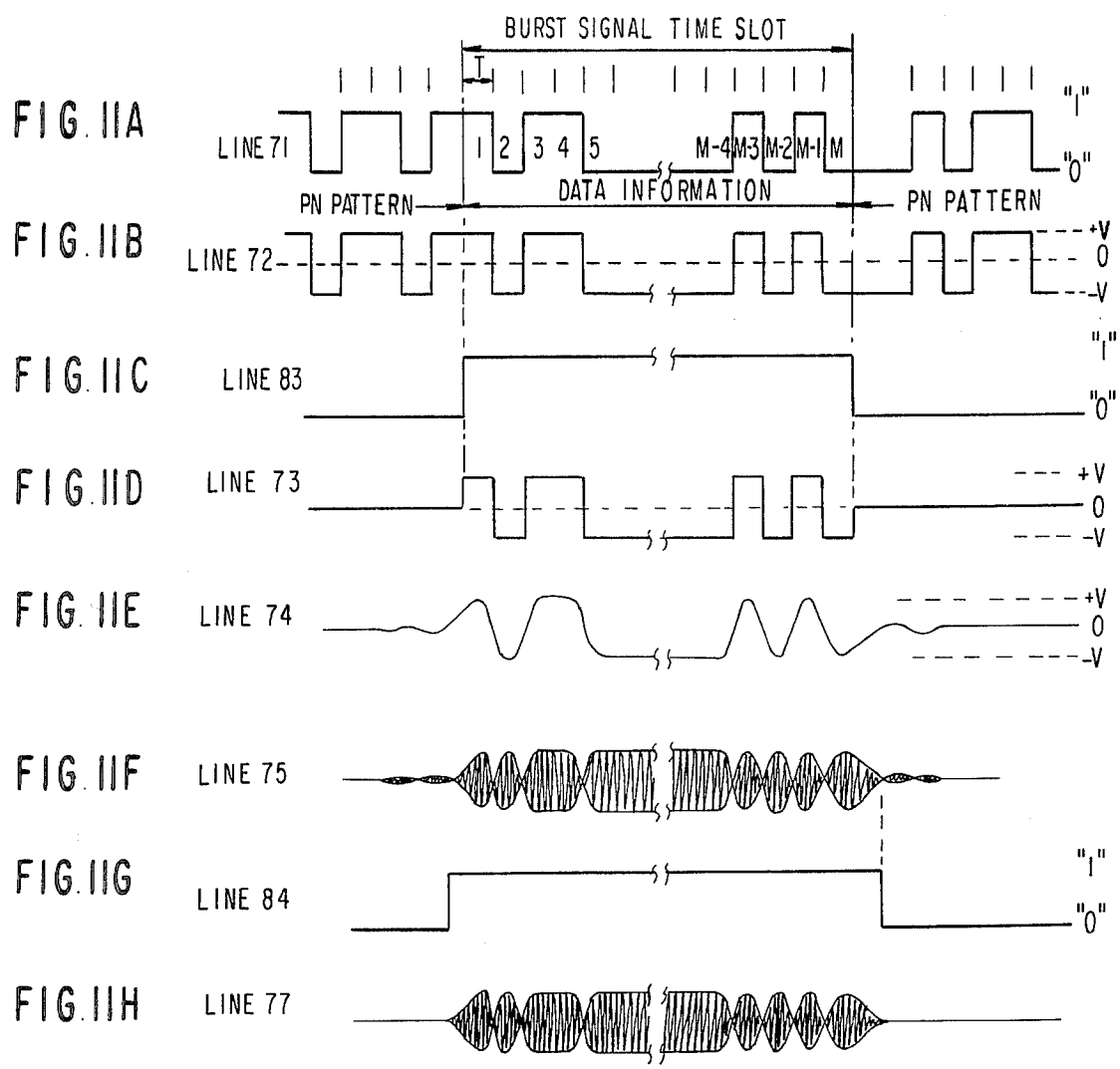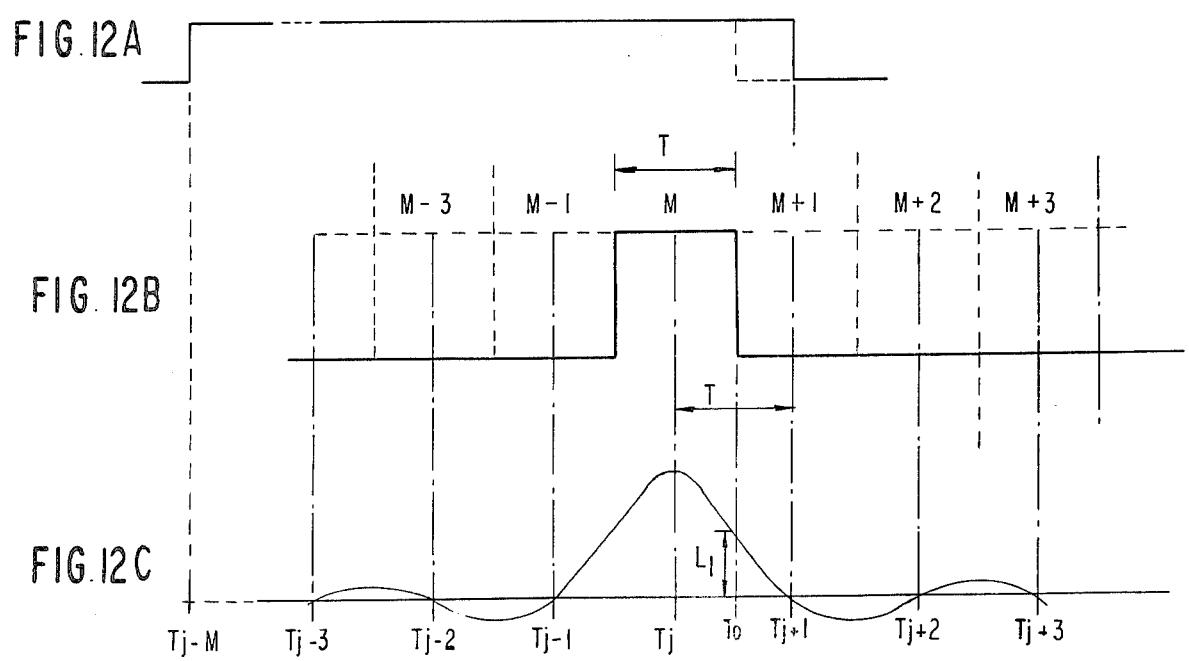

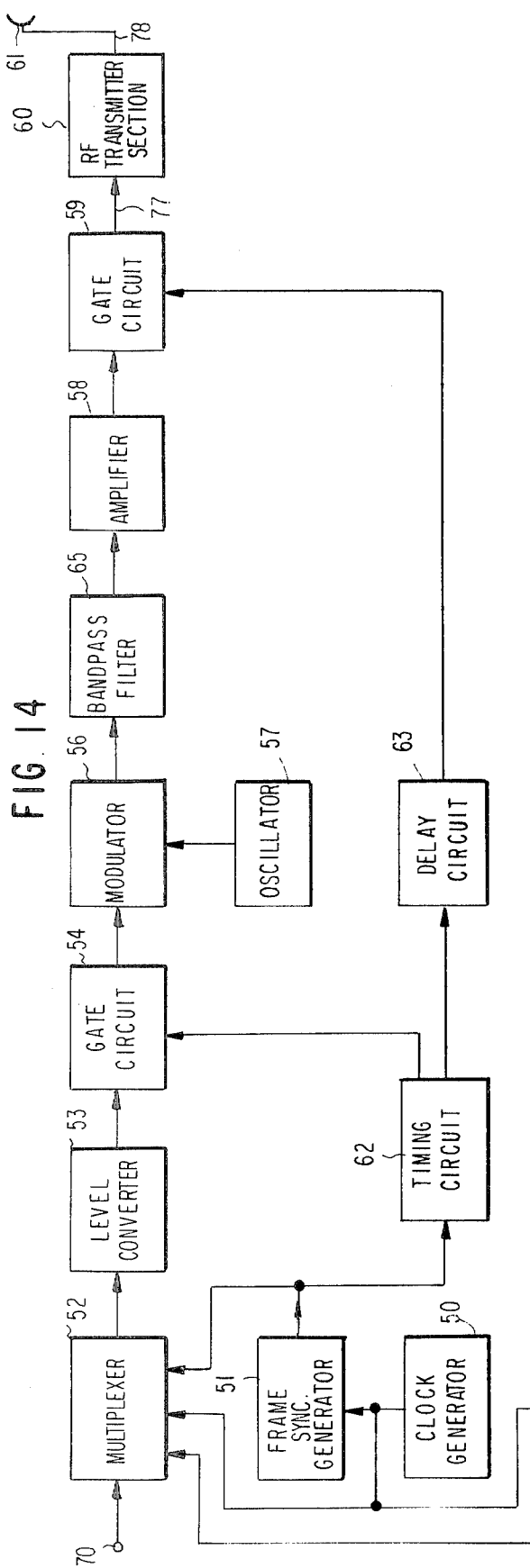
FIG. 14
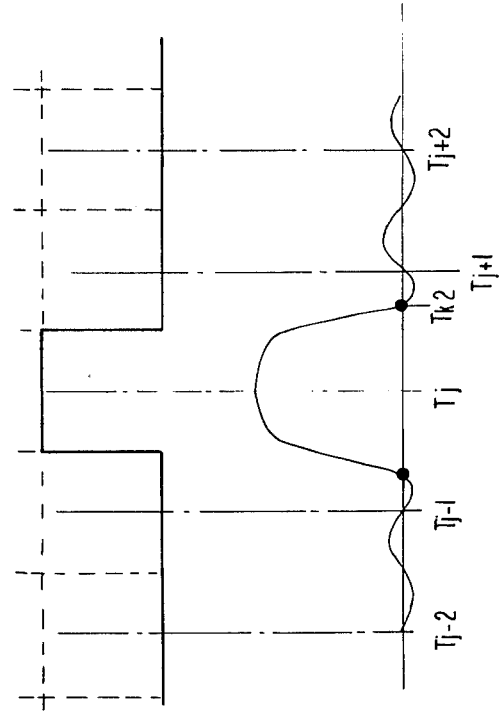
FIG. 13A
FIG. 13B

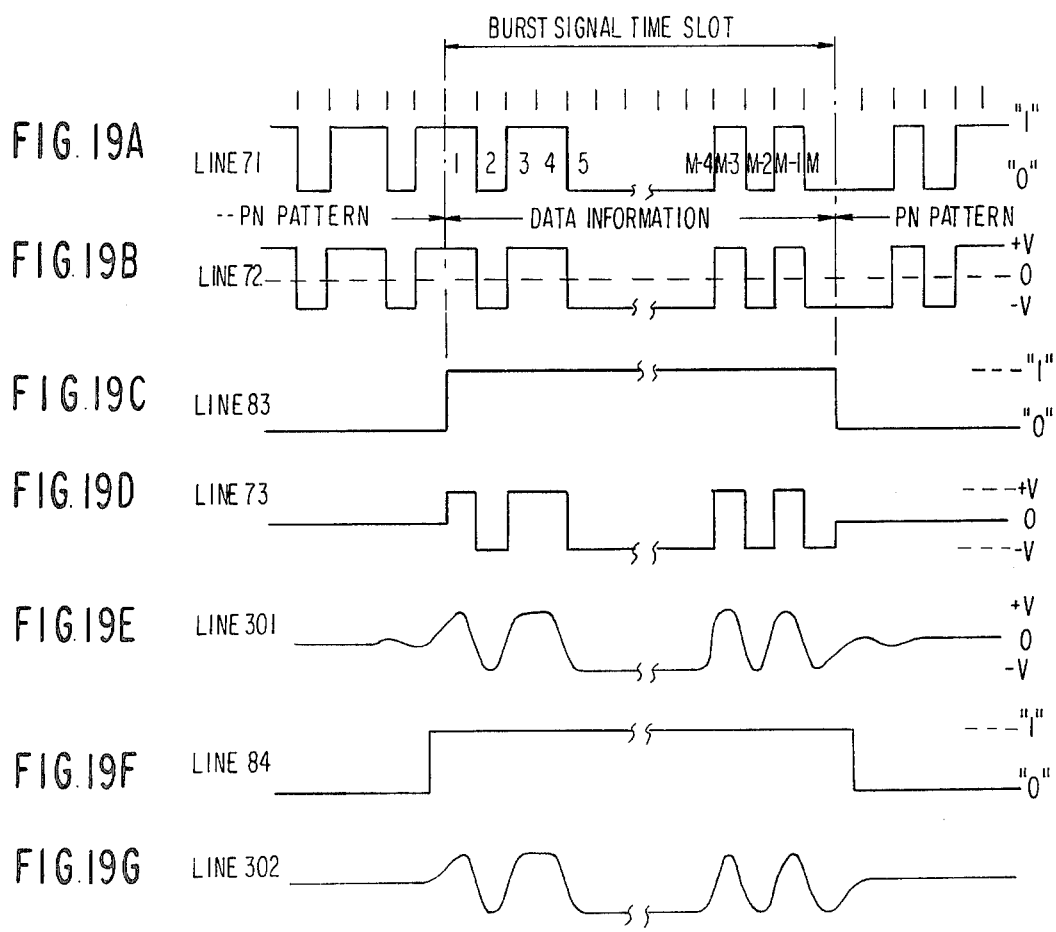

DIGITAL BURST SIGNAL TRANSMISSION SYSTEM

BACKGROUND OF INVENTION

The present invention relates to a digital burst signal transmission system for use in a multi-directional time division multiplex (MD-TDM) communication system for a point to multipoint communication and a time division multiple access (TDMA) communication system for a multipoint to multipoint satellite communication.

In a MD-TDM communication system, a central station (master station) transmits signals to peripheral stations (slave stations) on a time division basis, and each slave station picks up only the signals within the time slots assigned to it out of all the signals transmitted from the master station. Each slave station transmits burst signals to the master station within the time slots allocated thereto. In a TDMA communication system, on the other hand, many earth stations transmit and receive burst signals in a time division format via one satellite. Such burst signals can be obtained, for instance, by gating a modulated carrier wave. However, since this gating is achieved without regard to frequency spectrum, there occur steep discontinuations of the carrier wave at its leading and trailing edges. This results in a spread of the frequency spectrum and impulse interference with the adjoining frequency (or channel). Furthermore, the interfering impulse usually affects the channels of other systems at random, inviting deterioration of the code error rate.

Conventionally, this spectral spread has been prevented by the so-called roll-off waveform shaping with a transmission filter. However, since this waveform shaping adversely affects the waveform of the input pulse signal at both edges of a burst signal, if plural burst signals are to be sequentially transmitted, a code interference is unavoidable between the burst signals with the result that a few time slots are lost during which no information can be transmitted.

SUMMARY OF THE INVENTION

An object of the present invention, therefore, is to provide a digital burst signal transmission system of low code error rate and high transmission efficiency, which is suited for the above-mentioned MD-TDM and/or TDMA communication systems.

According to one aspect of the present invention, there is provided a digital burst signal transmission system comprising: first means for generating a first burst control signal synchronized with an input digital signal, and a second burst control signal having a pulse width larger than that of the first burst control signal; second means for gating the input digital signal in response to the first burst control signal to provide a step-wise digital burst signal; third means for frequency limiting the step-wise digital burst signal; and fourth means for gating the frequency-limited digital burst signal in response to the second burst control signal, thereby providing a digital burst signal. The second burst control signal may have its gating start and gating end points so timed as to have a substantially "0" level on the leading and trailing edges of the output of the third means, respectively.

According to another aspect of the present invention, there is provided a digital burst signal transmission system comprising: timing circuit means for generating a first burst control signal synchronized with an input digital signal, and a second burst control signal having a pulse width larger than that of the first burst control signal; first gate circuit means for switching on and off the input digital signal in response to the first burst control signal; filter means for frequency limiting the output of the first gate circuit means to provide a frequency-limited burst signal; second gate circuit means for switching on and off the frequency-limited burst signal in response to the second burst control signal to cut off the transient skirt in at least one of the edges of the frequency-limited burst signal; and modulator means provided on one of the input and output sides of the filter means for modulating a carrier wave with a signal on one of the input and output sides.

According to the other aspect of the present invention, there is provided a digital burst signal transmission system comprising: oscillator means for generating a carrier wave; timing circuit means for generating a first burst control signal synchronized with an input digital signal, and a second burst control signal having a pulse width larger than that of the first burst control signal; first gate circuit means for switching on and off said carrier wave in response to the first burst control signal to provide a burst carrier wave; modulator means for modulating the burst carrier wave with the input digital signal; filter means for frequency limiting the output of the modulator means to provide a frequency-limited burst signal; and second gate circuit means for switching on and off the frequency-limited burst signal in response to the second burst control signal to cut off the transient skirt in at least one of the edges of the frequency-limited burst signal.

BRIEF DESCRIPTION OF THE DRAWINGS

Other features and advantages of the invention will be more apparent from the detailed description hereunder taken in conjunction with the accompanying drawings, wherein:

FIG. 1 shows a block diagram of a digital multi-directional time division multiplex (MD-TDM) communication system to which the invention is applicable;

FIGS. 2A to 2C show typical arrangements of burst signals transmitted from the peripheral stations to the central station of FIG. 1;

FIG. 3 shows a typical arrangement of signals received by the central station;

FIG. 4 illustrates an example of a conventional digital burst signal transmission system;

FIGS. 5A to 5F show typical waveforms at various points of the transmission system illustrated in FIG. 4;

FIGS. 6A. to 6D show waveforms at various points of a modification of the transmission system illustrated in FIG. 4;

FIG. 7 illustrates a specific example of the circuit structure of the level converter referred to in FIG. 4;

FIG. 8 illustrates a specific example of the circuit structure of the gate circuit shown in FIG. 4;

FIG. 9 is a diagram for explaining the spread of the frequency spectrum;

FIG. 10 illustrates a first embodiment of a digital burst signal transmission system according to the present invention;

FIGS. 11A to 11H show typical waveforms at various points of the embodiment illustrated in FIG. 10;

FIGS. 12A to 12C and 13A to 13B are waveform diagrams for explaining the gating time;

FIG. 14 illustrates a second embodiment of the invention;

FIG. 19A to 19G show typical waveforms at various points of the embodiment shown in FIG. 18.

DETAILED DESCRIPTION OF THE INVENTION

Figure 15:
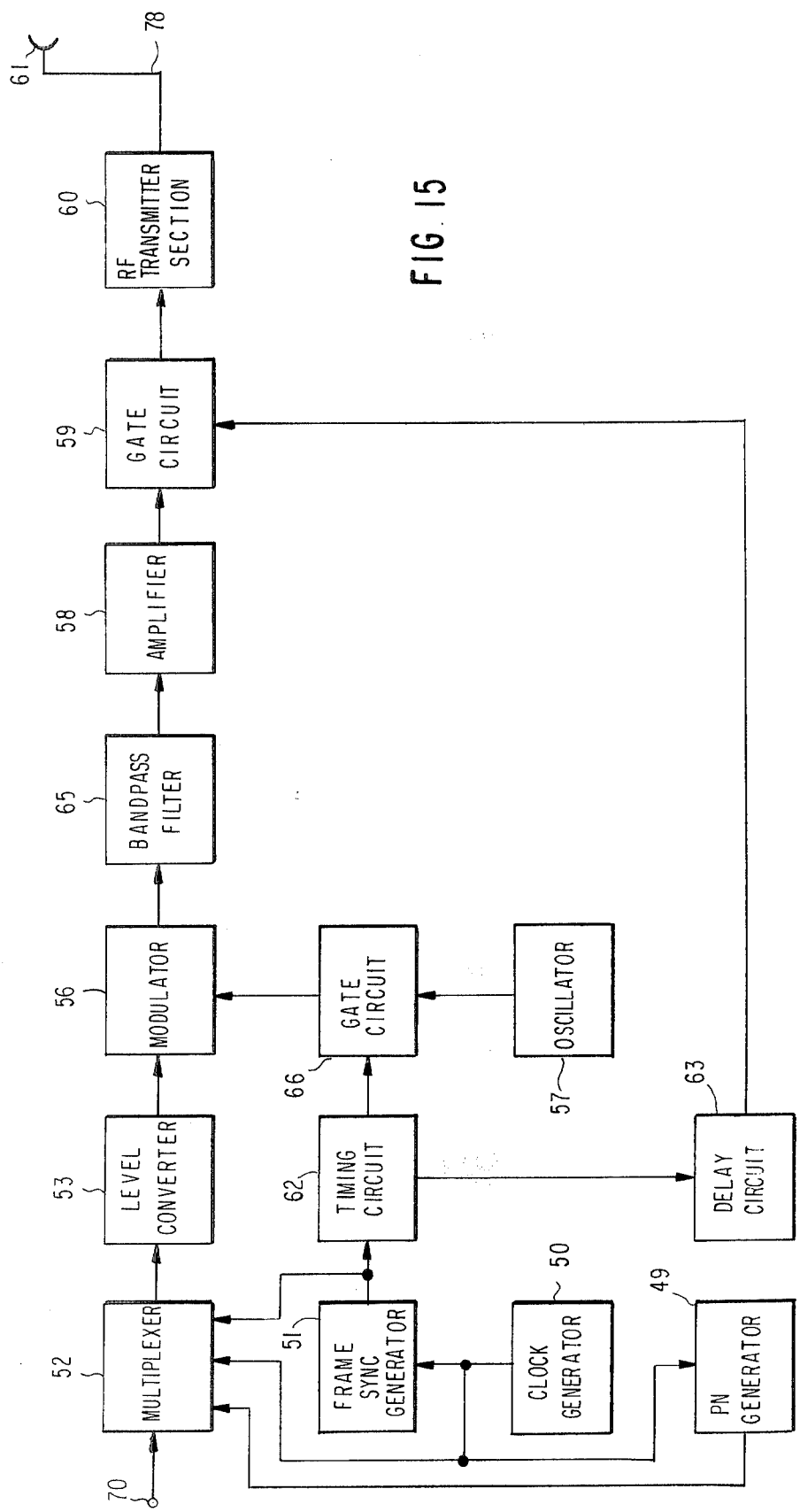
FIG. 15 illustrates a third embodiment of the invention.

In an MD-TDM communication system as illustrated in FIG. 1, peripheral stations 2 to 4 transmit burst signals A to C shown in FIGS. 2A to 2C, respectively, to a central station 1 so that the burst signals are received thereat in a time division multiplex (TDM) format as shown in FIG. 3. Although no guard times are provided between the burst signals A to C in the TDM signal format of FIG. 3, guard times may as well be provided to avoid overlapping owing to the fluctuation of delay times on the transmission paths, and interference between the signals of different stations.

The central station 1 transmits a continuous signal to the peripheral stations 2 to 4 in the conventional TDM signal format, and each of the peripheral stations extracts only the signal within the time slot assigned to it out of the TDM signal.

A conventional example of such a burst signal transmission system is illustrated in FIG. 4, wherein M-bit data information to be transmitted is supplied by way of a line 30 to a multiplexer 12 and is stored in a memory (not shown) provided therein. To the multiplexer 12 are also supplied pseudo-random noise (PN) signals, frame sync signals and clock signals from a PN generator 9, a frame sync generator 11 and a clock generator 10, respectively. In this multiplexer 12, as shown in FIG. 5A, PN signals are inserted into time slots other than those for data information, and frame sync signals are also inserted on a frame-by-frame basis, the frame being as shown in FIG. 3. A multiplexed logic signal (FIG. 5A) is converted by a level converter 13 into a signal such as that shown in FIG. 5B. This level converter 13, which can comprise an amplifier 130 as illustrated in FIG. 7, converts logic "1" and "0" input signals into voltages +V (volt) and −V, respectively. A modulator 14 two-phase phase-modulates a carrier wave from an oscillator 15 with this level-converted signal (FIG. 5B) to thereby generate a PSK modulated carrier wave (FIG. 5C) which is supplied through an amplifier 16 to a gate circuit 17. A timing circuit 21, in synchronization with a frame sync signal from the frame sync generator 11, generates a gate signal (FIG. 5D) having the same time width (or an M-bit time width) as that of the data information, and supplies this gate signal by way of a delay circuit 22 to the gate circuit 17. The delay caused by delay circuit 22 is adjusted to be equal to the total delay of the circuits 12 to 16. However, for simplicity of description, the timing charts of FIGS. 5A to 5F do not show the delays caused by these circuits.

The gate circuit 17 gates the modulated wave (FIG. 5C) with the gate signal (FIG. 5D) to generate a stepwise burst signal as shown in FIG. 5E. This gate circuit 17 is composed of an amplifier 171 and diodes 172 and 173, as illustrated in FIG. 8. The gate signal on the line 44 is supplied to the amplifier 171 to generate mutually complementary output signals, as shown in FIG. 8. When the gate signal is at the logic "1" level, the diodes 172 and 173 are non-conductive, so that the signal from the line 34 emerges as it is on a line 35. On the other hand, when the gate signal is at the logic "0" level the diodes 172 and 173 are conductive, so that the electric potential at the junction point of the diodes is 0 (volt) and therefore, the signal on line 35 is 0 volt, as shown in FIG. 5E.

The output of the gate circuit 17 is supplied to a band-pass filter (BPF) 18 to provide a burst signal subjected to spectrum limitation (FIG. 5F), which is transmitted by way of an RF transmitter section 19 and an antenna 20 to the central station. Reference numerals 30 to 37 and 40 to 44 represent signal lines.

As a modification of the transmission system illustrated in FIG. 4, a system is conceivable in which the BPF 18 is absent and instead a baseband low-pass filter (LPF) is inserted between the level converter 13 and the modulator 14. The output of the LPF has the waveform of FIG. 6A; that of the modulator 14, the waveform of FIG. 6B; that of the timing circuit 21, the waveform of FIG. 6C; and that of the gate circuit 17, the waveform of FIG. 6D.

A burst signal thereby obtained (FIG. 6D), as its leading and trailing edges are usually steeply cut off by gate signals (FIG. 6C), constitutes a discontinuous carrier wave. Without this discontinuity, it would have an amplitude spectrum as indicated by solid line A in FIG. 9, which is determined by the aforementioned LPF, but because of this discontinuity, the spectrum is spread as represented by dotted line B in FIG. 9. This inflicts impulse interference on the channel of an adjoining system. Since adjoining systems are usually operated unsynchronized with each other, this impulse interference gives a high bit error rate at random to the channel of the other system.

To prevent such spectral spread due to gate signals, burst signals are shaped into a waveform as shown in FIG. 5F with the aforementioned BPF 18. However, since this results in the disturbance of impulse response at the leading and trailing edges of burst signals as is obvious from FIG. 5F when plural burst signals are continuously transmitted as shown in FIG. 3, intercode interference occurs at the interfaces between the burst signals, giving rise to time slots wherein information cannot be correctly transmitted.

A burst signal transmission system according to the present invention, which is free from this disadvantage, is illustrated in FIG. 10.

The features of the transmission system of FIG. 10 are that the waveform shaping of input data signals and gate signals is accomplished by a low-pass filter (LPF) 55 which, together with a gate circuit 54, is provided between a level converter 53 and a modulator 56; that the disturbance of impulse response at the edges of burst signals is intercepted by a gate circuit 59; and further that this interception is timed to be close to the "0" level of the envelope of the burst carrier wave.

The transmission system of FIG. 10 will be described in specific detail hereunder. A multiplexer 52 in FIG. 10, like the multiplexer 12 in FIG. 4, multiplexes M-bit data information, which is to be transmitted, on a line 70, frame sync signals from a frame sync generator 51 and PN signals from a PN generator 49 according to clock signals from a clock generator 50, and generates a signal such as the one shown in FIG. 11A. This signal is converted by the level converter 53 into a signal like that of FIG. 11B. A timing circuit 62 generates a gate signal on line 83 which is synchronized with the frame sync signals and, as shown in FIG. 11C, is as wide as the time width assigned to the station, i.e., the burst signal time slot. The gate circuit 54 passes the signal of FIG. 11B with this gate signal, and provides on a line 73 a 3-level (0, ±V) signal as shown in FIG. 11D. This signal is waveform-shaped by the LPF 55, which has a roll-off characteristic, into the signal of FIG. 11E. Thus, the LPF 55 achieves the waveform shaping of both the data information to be transmitted and the gate signal. The output of the LPF 55 is fed to the modulator 56 to linearly modulate a carrier wave from an oscillator 57 and thereby provide a burst modulated carrier wave as shown in FIG. 11F. Thus, if the output of the LPF 55 is 0 volt, the output amplitude of the modulator 56 will be 0. If the output signal of the LPF 55 is positive, the output of the modulator 56 will have the same phase as the carrier wave (i.e. 0 phase) and an envelope amplitude proportional to the voltage of the signal on line 74. If the signal on line 74 is negative, the modulator 56 will generate an output having a phase (i.e. $\pi$ phase) reversed to that of the carrier wave and an envelope amplitude proportional to the voltage of the signal on line 74. For an example of such a modulator 56, reference is made to U.S. Pat. No. 3,973,201. Although this patent specifies a four-phase modulator, the phase modulator 14 of FIG. 1 is adequate for a two-phase modulation system.

The burst modulated carrier wave is amplified by an amplifier 58, and fed to one of the input terminals of the gate circuit 59. A gate signal (FIG. 11G) from a timing circuit 62 is supplied by way of a delay circuit 63 to the other input terminal of the gate circuit 59. This gate signal is used for intercepting the transient skirts of the edge portions of the burst modulated wave shown in FIG. 11F. The timing on edges of this gate signal, selected at a point of time of an approximately "0" level on the transient skirts of the edge portions of the burst modulated wave shown in FIG. 11F, serves to eliminate the frequency spectral spread and at the same time to reduce the influence on other adjoining burst modulated waves. The output (FIG. 11H) of gate circuit 59 is transmitted by way of an RF transmitter section 60 and an antenna 61 to the central station. Reference numerals 70 to 85 represent signal lines.

The aforementioned selection of the timing on the edge of the gate signal will be described in further detail hereunder. The pulse signal shown in FIG. 11D undergoes a waveform change into that shown in FIG. 11E because of the frequency response characteristics of the LPF 55. Supposing that one bit pulse of a data signal input to the LPF 55 is like FIG. 12B, its output is like FIG. 12C due to the roll-off characteristic of the filter, the output having a value of nearly 0 at the sampling time point $T_{j\pm n}$ of another bit which is n (n=1, 2, 3, .., n) bits (i.e. nT) away from the sampling point $T_j$ of said bit. The same can be said of the output of modulator 56. Therefore, if the timing of the edges of the gate signal on line 85 is selected at the time $T_{j+1}$ and $T_{j-M}$ as represented by a solid line in FIG. 12A, i.e., the gate time width is selected at $(M+1)T$, there arises no gating noise. If the timing on the edges is selected at the time $T_0$ of the edge of the assigned burst signal time slot, as represented by a dotted line in FIG. 12A, the gate is closed at a level $L_1$, with the result that gating noise arises, the spectrum is spread and the channels of other systems are affected. Thus, when many burst signals are time division multiplexed as shown in FIG. 3, and the burst signals of other stations are sufficiently attenuated at any sample point, it is permissible to have the final bit of any burst directly followed by the first bit of the next burst without providing a guard time but therebetween, if the transmission timing of the burst signals is precisely controlled.

On the other hand, if the limitation on the spectral spread is comparatively loose, before the sampling point $T_{j+1}$ a point $T_{k2}$ emerges at which the response value of the signal of FIG. 13A is nearly 0. Therefore, the trailing edge of the gate signal can as well be selected at this point of time $T_{k2}$. In this case, the width of the gate signal would be smaller than $(M+1)T$.

In FIG. 14 illustrating a second embodiment of the present invention, an outgoing burst signal on line 78 which the system provides is equal to the outgoing burst signal on line 78 referred to in connection with FIG. 10. Circuits herein having the same reference numerals have the same functions as the respectively corresponding circuits in FIG. 10. The system of FIG. 14 differs from that of FIG. 10 in that, while the carrier wave is modulated by the modulator 56 after it is waveform-shaped by the LPF in the system of FIG. 10, in the system of FIG. 14 the carrier wave is waveform-shaped by a band-pass filter 65 having prescribed characteristics (roll-off and the like) after it is modulated by the modulator 56 with the output of a gate circuit 54. However, the resultant outgoing burst signals of both systems are the same.

In a third embodiment of the invention illustrated in FIG. 15, a gate circuit 66 on/off controls a carrier wave from an oscillator 57 in response to a signal (FIG. 11C) from a timing circuit 62. The output of this gate circuit 66 is modulated with the output of a level converter 53, and the modulated signal is waveform-shaped by a BPF 65. In all other respects, this system is the same as that of FIG. 14, and the two systems transmit the same burst signals on line 78.

Figure 16:
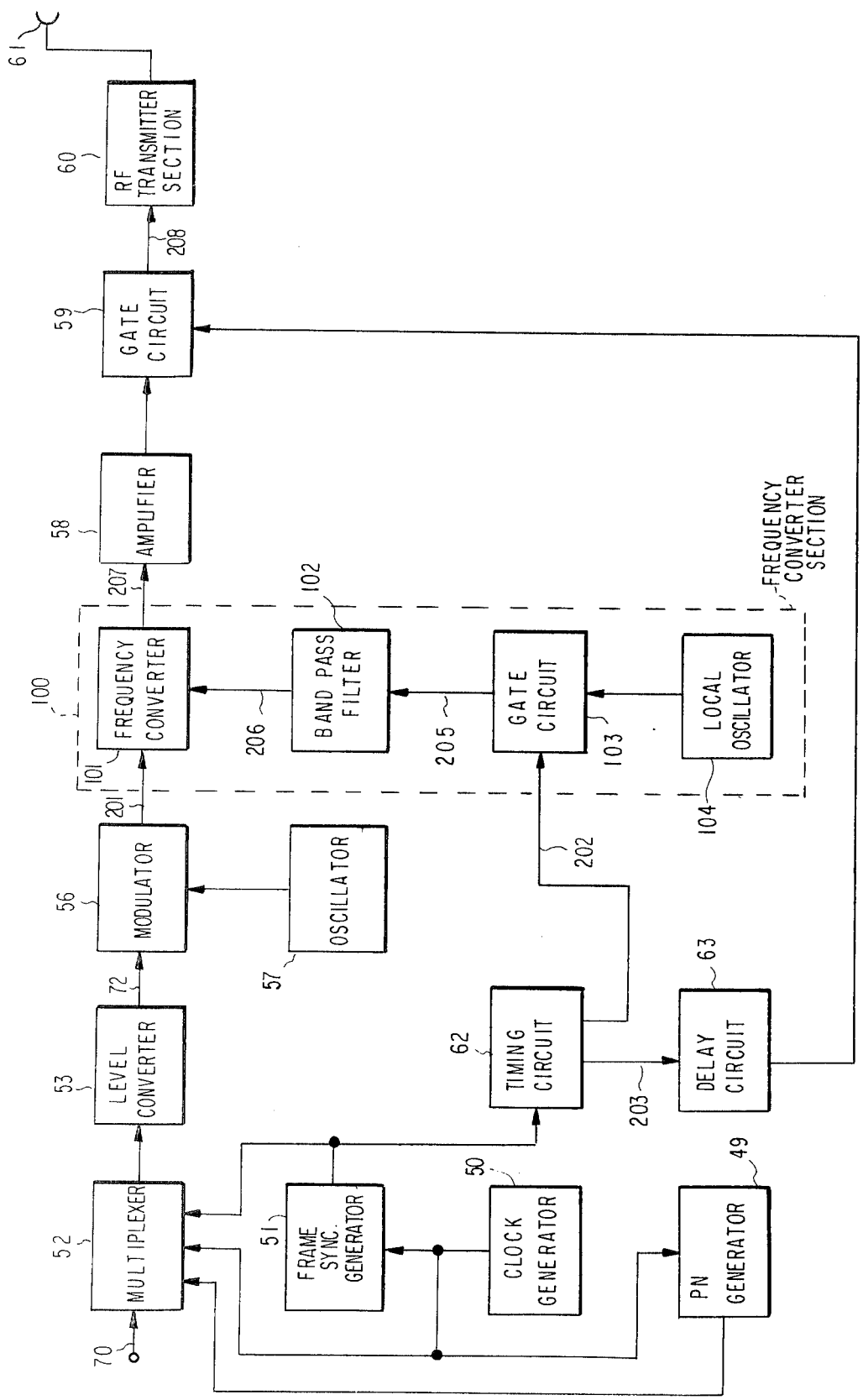
FIG. 16 illustrates a fourth embodiment of the invention.
Figure 17:
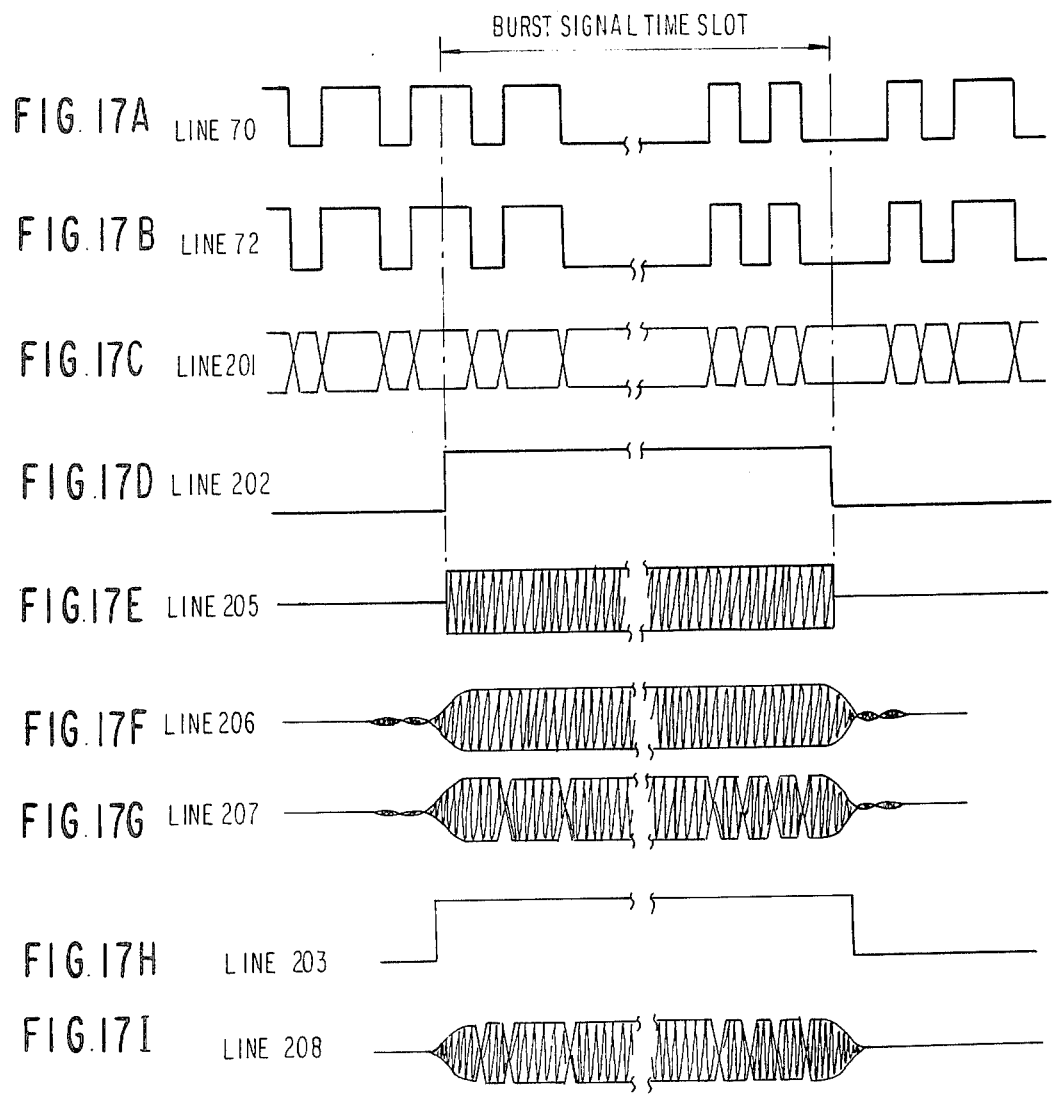
FIGS. 17A to 17I show typical waveforms at various points of the embodiment illustrated in FIG. 16.

FIG. 16 shows a fourth embodiment of the invention, which features a frequency converter section 100 having a gate circuit 103 and a waveform shaping BPF 102 between a frequency converter 101 and a local oscillator 104. The gate circuit 103 on-off controls a carrier wave from the local oscillator 104 in response to the output of a timing circuit 62 (FIG. 17D). The output of this gate circuit 103 (FIG. 17E) is waveform-shaped by the BPF 102. The frequency converter 101 frequency-converts the output of a modulator 56 (FIG. 17C) with the output of the BPF 102 (FIG. 17F) to generate a burst signal as shown in FIG. 17G. Another gate circuit 59 gates the output of the frequency converter 101 having passed an amplifier 58 with a gate signal (FIG. 17H) to provide a signal as shown in FIG. 17I. In the system of FIG. 16, circuits having the same functions as those in FIGS. 10, 14 and 15 are assigned respectively the same reference numerals. FIGS. 17A and 17B show the waveforms of signals on lines 70 and 72, respectively.

Figure 18:
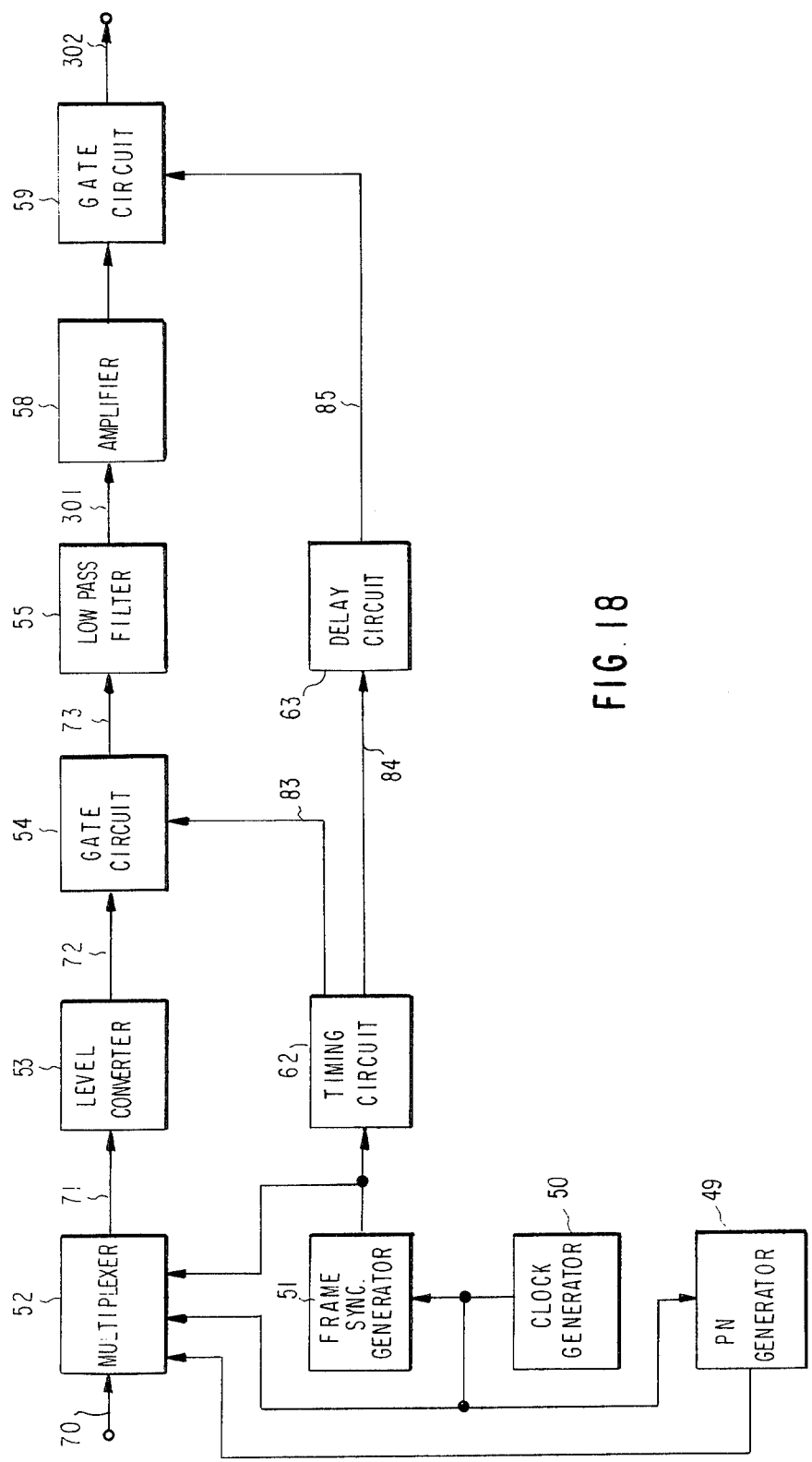
FIG. 18 illustrates a fifth embodiment of the invention.

A fifth embodiment of the present invention shown in FIG. 18 is suitable for a baseband signal transmission system in which a baseband digital signal on line 71 is transmitted to other stations without being subjected to any modulation, i.e., frequency conversion as mentioned in the first to fourth embodiments of the invention. The waveforms on lines 71, 72, 83, 73, 301, 84 and 302 are shown in FIGS. 19A to 19G.

Although the aforementioned first to fourth embodiments of the invention are supposed to use two-phase modulation to simplify the description, it will be obvious that the invention is applicable to $2^P$-phase (P=2, 3, 4, ...) modulation, quadrature amplitude modulation, etc. as well. When each peripheral station transmitting burst signals regenerates frame sync signals and clock signals from signals received from the central station, as disclosed in commonly assigned U.S. patent application Ser. No. 46,055 filed on June 6, 1979, the regenerated frame sync signals and clock signals can be used to dispense with generators 50 and 51. Also, a "1010..." pattern generator can be used in place of a PN generator 49.

Signals $S_{-1}$ and $S_{M+1}$ may be provided preceding the signal $S_1$ of the first bit of the burst data signal (FIG. 11A) and following the signal $S_M$ of the Mth bit thereof, respectively, so that the signals $S_{-1}$ (for example, logic "0" signal) and $S_{M+1}$ (for example, logic "1" signal) have polarities opposite to the signals $S_1$ (for example, logic "1" signal) and $S_M$ (for example, logic "0" signal), respectively. In such a signal format since the signal having passed through the LPF 55 (FIG. 10) has a "0" level at the points between the adjoining signals $S_{-1}$ and $S_1$, and $S_M$ and $S_{M+1}$, the gate circuit 59 (FIG. 10) can be controlled by a gating signal of approximately MT time width.

The burst signal transmission system of the present invention also is applicable to satellite communication (see, for example, M. Takada et al., "New PCM-TDMA Satellite Communication System and Variable Destination Channel Control Technique", INTELSAT/IEE International Conference on Digital Satellite Communication, pp. 39-50, November 1969).

The present invention, as hitherto described, makes it possible to compose a single filter circuit so as to concurrently achieve the waveform shaping of data signals to be transmitted and that of gate signals for burst control. Also, by aligning the edges of each gate signal to a point in time of approximately 0 level on the edges of an outgoing burst signal, the spectral spread of the burst signal can be suppressed. As a result, this reduces its influences on the channels of adjoining systems, prevents inter-code interference between data signals and averts deterioration of the code error rate. Therefore, the present invention makes it possible to reduce or eliminate guard time slots that are otherwise needed between outgoing burst signals to prevent interference with other peripheral stations within the same system. Thus, the present invention can enhance the efficiency of data transmission.

What is claimed is:

1. A digital burst signal transmission system comprising:
    (a) first means for generating a first burst control signal synchronized with an input digital signal, and a second burst control signal having a pulse width larger than that of said first burst control signal;
    (b) second means for gating said input digital signal in response to said first burst control signal to provide a step-wise digital burst signal;
    (c) third means for frequency limiting said step-wise digital burst signal; and
    (d) fourth means for gating the frequency-limited digital burst signal in response to said second burst control signal to suppress the spectral spread of said frequency-limited digital burst signal, thereby providing a desired digital burst signal.

2. A digital burst signal transmission system as claimed in claim 1, wherein said second control signal has gating start and gating end points so timed as to have a substantially "0" level at the leading and trailing edges of the output of said third means, respectively.

3. A digital burst signal transmission system comprising:
    (a) first means for generating a first burst control signal synchronized with an input digital signal and a second burst control signal;
    (b) second means for gating an input digital signal in response to said first burst control signal to provide a step-wise digital burst signal;
    (c) third means for frequency limiting said step-wise digital burst signal; and
    (d) fourth means for gating the frequency-limited digital burst signal in response to said second burst control signal having gating start and gating end points so timed as to have a substantially "0" level at the leading and trailing of the output of said third means, respectively, and for providing a desired digital burst signal.

4. A digital burst signal transmission system comprising:
    (a) timing circuit means for generating a first burst control signal synchronized with an input digital signal, and a second burst control signal having a pulse width larger than that of said first burst control signal;
    (b) first gate circuit means for switching on and off said input digital signal in response to said first burst control signal;
    (c) filter means for frequency limiting the output of said first gate circuit means to provide a frequency-limited burst signal;
    (d) modulator means for modulating a carrier wave with said frequency-limited burst signal to provide a modulated burst signal; and
    (e) second gate circuit means for switching on and off said modulated burst signal in response to said second burst control signal to cut off a transient skirt on at least one of the edges of said modulated burst signal to thereby provide a desired burst signal.

5. A digital burst signal transmission system comprising:
    (a) oscillator means for generating a carrier wave;
    (b) timing circuit means for generating a first burst control signal synchronized with an input digital signal, and a second burst control signal having a pulse width larger than that of said first burst control signal;
    (c) first gate circuit means for switching on and off said carrier wave in response to said first burst control signal to provide a burst carrier wave;
    (d) modulator means for modulating said burst carrier wave with said input digital signal;
    (e) filter means for frequency limiting the output of said modulator means to provide a frequency-limited burst signal; and
    (f) second gate circuit means for switching on and off said frequency-limited burst signal in response to said second burst control signal to cut off a transient skirt on at least one of the edges of said frequency-limited burst signal.

6. A digital burst signal transmission system, comprising:
   (a) timing circuit means for generating a first burst control system synchronized with an input digital signal, and a second burst control signal having a pulse width larger than that of said first burst control signal;
   (b) first gate circuit means for switching on and off said input digital signal in response to said first burst control signal;
   (c) modulator means for modulating a carrier wave with the output of said first gate circuit means to provide a modulated burst signal;
   (d) filter means for frequency limiting said modulated burst signal; and
   (e) second gate circuit means for switching on and off said frequency-limited burst signal in response to said second control signal to cut off a transient skirt on at least one of the edges of said frequency-limited burst signal to thereby provide a desired burst signal.

7. A digital burst signal transmission system as claimed in claim 4, wherein said filter means comprises a lowpass filter.

8. A digital burst signal transmission system as claimed in claim 3, wherein said third means comprises a lowpass filter.

9. A digital burst signal transmission system as claimed in claim 4, wherein said filter means comprises a lowpass filter.

10. A digital burst signal transmission system as claimed in claim 6, wherein said filter means comprises a bandpass filter.

11. A digital burst signal transmission system as claimed in claim 5, wherein said filter means comprises a bandpass filter.

12. A digital burst signal transmission system, comprising:
   (a) oscillator means for generating a first carrier wave;
   (b) timing circuit means for generating a first burst control signal synchronized with an input digital signal, and a second burst control signal having a pulse width larger than that of said first burst control signal;
   (c) first gate circuit means for switching on and off said first carrier wave in response to said first control signal to provide a burst carrier wave;
   (d) filter means for frequency limiting said burst carrier wave;
   (e) modulator means for modulating a second carrier wave with said input digital signal;
   (f) frequency converter means for mixing the output of said filter means with the output of said modulator means; and
   (g) second gate circuit means for switching on and off the output of said frequency converter means in response to said second burst control signal to suppress the spectral spread of the output of said frequency converter means to thereby provide a desired digital burst signal.

13. A digital burst signal transmission system as claimed in claim 12, wherein said filter means comprises a bandpass filter.

* * * * *

UNITED STATES PATENT AND TRADEMARK OFFICE
CERTIFICATE OF CORRECTION

PATENT NO. : 4,485,478
DATED : November 27, 1984
INVENTOR(S) : Masami Takada

It is certified that error appears in the above-identified patent and that said Letters Patent is hereby corrected as shown below:

Column 7, line 22, after "format" insert a comma;

Line 24, before "points" insert -- adjoining --;

Line 24, before "signals" delete "adjoining".

Signed and Sealed this

Thirteenth Day of August 1985

[SEAL]

Attest:

DONALD J. QUIGG

Attesting Officer   Acting Commissioner of Patents and Trademarks